(12) United States Patent
Storino et al.

(10) Patent No.: US 7,203,518 B2
(45) Date of Patent: Apr. 10, 2007

(54) METHOD AND APPARATUS FOR SIMPLIFIED DATA DISPENSATION TO AND FROM DIGITAL SYSTEMS

(75) Inventors: Salvatore Nicholas Storino, Rochester, MN (US); Gregory John Uhlmann, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1158 days.

(21) Appl. No.: 09/789,283

(22) Filed: Feb. 20, 2001

(65) Prior Publication Data

US 2002/0115428 A1   Aug. 22, 2002

(51) Int. Cl.
*H04Q 7/20*   (2006.01)
(52) U.S. Cl. .................. 455/561; 455/412.1; 455/418; 455/439; 370/286; 700/11
(58) Field of Classification Search ............... 455/418, 455/412.1, 556.2, 439, 561; 370/463, 286; 709/212, 214; 375/220; 340/7.21; 700/11
See application file for complete search history.

(56) References Cited

U.S. PATENT DOCUMENTS

| | | | | |
|---|---|---|---|---|
| 5,497,396 A | * | 3/1996 | Delprat | 375/220 |
| 5,793,630 A | * | 8/1998 | Theimer et al. | 700/11 |
| 5,999,817 A | * | 12/1999 | Posti et al. | 455/439 |
| 6,021,325 A | * | 2/2000 | Hall | 455/412.1 |
| 6,034,621 A | * | 3/2000 | Kaufman | 340/7.21 |
| 6,052,580 A | * | 4/2000 | Khakoo | 455/418 |
| 6,188,699 B1 | * | 2/2001 | Lang et al. | 370/463 |
| 6,308,201 B1 | * | 10/2001 | Pivowar et al. | 709/214 |
| 6,311,058 B1 | * | 10/2001 | Wecker et al. | 455/418 |
| 6,545,985 B1 | * | 4/2003 | Suvanen | 370/286 |
| 6,573,901 B1 | * | 6/2003 | Rai | 345/547 |
| 7,024,227 B1 | * | 4/2006 | Geppert | 455/561 |
| 2002/0087651 A1 | * | 7/2002 | Uhlmann | 709/212 |

* cited by examiner

*Primary Examiner*—Fan Tsang
*Assistant Examiner*—M S A Elahee
(74) *Attorney, Agent, or Firm*—Dillon & Yudell LLP

(57) ABSTRACT

A wireless data retrieval device and method for implementing the same. In accordance with one embodiment of the invention, the wireless data retrieval device includes a first-in-first-out (FIFO) memory queue in the form of a linked list that stores standardized correspondence information. The wireless data retrieval device further includes an input/output device configured to transmit the standardized correspondence information to and receive said standardized correspondence information from a wireless channel.

8 Claims, 3 Drawing Sheets

METHOD AND APPARATUS FOR SIMPLIFIED DATA DISPENSATION TO AND FROM DIGITAL SYSTEMS

CROSS REFERENCE TO RELATED APPLICATIONS

The present application is related to the following copending U.S. patent applications: U.S. patent application Ser. No. 09/750,259 filed on Dec. 28, 2000, titled "Method And Apparatus For Transferring Correspondence Information." The above mentioned patent application is assigned to the assignee of the present invention. The content of the cross referenced copending application is hereby incorporated herein by reference thereto.

BACKGROUND OF THE INVENTION

1. Technical Field

The present invention relates in general to data transmission and storage, and in particular to a method and apparatus for performing wireless dispensation of information to and from personal digital assistant (PDA) devices.

2. Description of the Related Art

The personal digital assistant (PDA) device is a popular hand-held, computer controlled device capable of a variety of features. PDA devices enable users to store important information, play games, send electronic mail (e-mail) and perform word processing applications. Examples of such important information include phone numbers, business addresses, e-mail addresses, personal notes, business card information and appointment information.

The PDA device is particularly convenient for storing information in business settings. For example, a user may wish to enter correspondence information with many business contacts. In this situation, the user is required to manually enter the business card correspondence information, e.g., name, phone number and business address on business cards, into the PDA device. Alternatively, the user may obtain this information by synching or synchronizing the PDA device with another PDA device.

However, such synchronization requires that both PDA devices use the same operating system. As such, information transfer is generally limited between PDA devices using the same operating system. Additionally, the PDA device remains too expensive for many consumers. Thus, there exists a need for an alternative inexpensive device that performs wireless transmission of correspondence information with different types of existing PDA devices.

SUMMARY OF THE INVENTION

A wireless data retrieval device and method for implementing the same are disclosed herein. In accordance with one embodiment of the invention, the wireless data retrieval device includes a first-in-first-out (FIFO) memory queue in the form of a linked list that stores standardized correspondence information. The wireless data retrieval device further includes an input/output device configured to transmit the standardized correspondence information to and receive said standardized correspondence information from a wireless channel.

All objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

This invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention.

As explained with reference to the figures, the present invention provides a method and apparatus for dispensing correspondence information to and from personal digital assistant (PDA) devices. Examples of such correspondence information include business card information and calendar appointment information. A portable data retrieval apparatus includes a wireless data transfer interface over which the correspondence information is collected from a PDA device. The data retrieval apparatus further comprises a memory device that employs First-In-First-Out (FIFO) queueing to facilitate simple and efficient data storage within a linked list. Correspondence information collected within the data retrieval apparatus is retrieved from the linked list, translated into a format utilized by an operating system of a PDA device, and transmitted to the PDA device.

In one embodiment, the apparatus is a wireless data retrieval apparatus for performing wireless reception of correspondence information from a PDA device. The wireless data retrieval apparatus may also perform a wireless transmission of correspondence information to a PDA device. By performing such wireless reception and transmission between PDA devices, the wireless data retrieval apparatus is not concerned with other aspects of the PDA device, e.g., games, electronic mail (e-mail) and word processing. As such, the wireless data retrieval apparatus represents an inexpensive alternative to conventional PDA devices for transmitting and receiving correspondence information between different types of PDA devices. Additionally, the wireless data retrieval apparatus also achieves a significant scaled-down device in comparison to PDA devices that support a variety of computing features.

Figure 1:
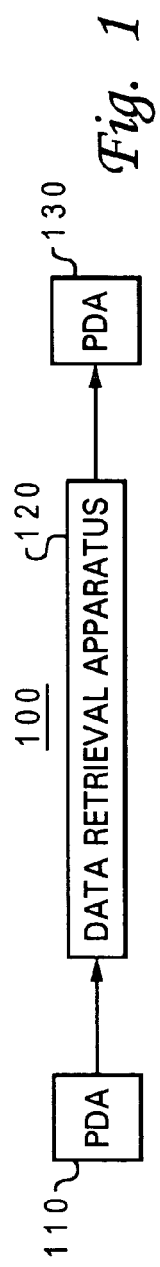
FIG. 1 illustrates a high-level block diagram of a data transfer system utilized in the present invention.

With reference to the figures wherein like reference numerals refer to like and corresponding parts throughout, and in particular with reference to FIG. 1, there is depicted a data transfer system 100 illustratively utilized in accordance with the present invention. Data transfer system 100 illustratively comprises a transmitting PDA device 110, a wireless data retrieval apparatus 120, and a receiving PDA device 130. Transmitting PDA device 110 is configured to transmit correspondence information to wireless data retrieval apparatus 120, while receiving PDA device 130 is configured to receive correspondence information from wireless data retrieval apparatus 120. Examples of correspondence information include business card information, calendar appointment information and the like.

In one embodiment of the present invention, wireless data retrieval apparatus 120 transmits previously stored correspondence information to receiving PDA device 130. In another embodiment of the invention, wireless data retrieval apparatus 120 receives correspondence information from transmitting PDA device 110 and then transmits the received correspondence information to receiving PDA device 130. Wireless, e.g., infrared, transmission of correspondence information occurs between wireless data retrieval apparatus 120, transmitting PDA device 110 and receiving PDA device 130. However, wireless data retrieval apparatus 120 may also transmit correspondence information to any other type computer-controlled device, e.g., a personal computer. Thus, the transmission of information between wireless data retrieval apparatus 120 and such computer-controlled devices may incorporate a serial connection, e.g., a cable.

Transmitting PDA device 110 and receiving PDA device 130 are hand-held, computer-controlled devices capable of transmitting and receiving different types of data. Transmitting PDA device 110 and receiving PDA device 130 may comprise commercially available PDA devices such as the 3Com Palm, the Casio Casiopeia and the Hewlett Packard Jornada. PDA devices 110 and 130 may include such devices as the Palm Pilot™, the Windows CE™ and the Handspring Visor™, which utilize different operating systems.

Each of PDA devices 110 and 130 may run different types of applications based upon the demands of differing operating systems. Common examples of PDA operating systems include the 3Com Palm, the Microsoft Windows CE, and the Microsoft Pocket PC. The operating system also determines the format of data files in the PDA device transferred between wireless data retrieval apparatus 120 and PDA devices 110 and 130. The operating system further controls the synchronization of transmitting PDA device 110 and receiving PDA device 130 with wireless data retrieval apparatus 120 prior to any transfer of correspondence information.

Wireless data retrieval apparatus 120 is a portable computer controlled module specifically configured to transfer, e.g., receive and transmit, correspondence information between different types of PDA devices 110 and 130. As PDA devices 110 and 130 may employ different operating systems and correspondingly different data formats, wireless data retrieval apparatus 120 includes processing functionality for converting the correspondence information received from the input or transmitting PDA device 110 into a common format for storage. The operating system utilized by wireless data retrieval apparatus 120 dictates the format of the converted correspondence information. In accordance with a preferred embodiment, wireless data retrieval apparatus 120 further includes processing functionality for converting the correspondence information into a format suitable for the output or receiving PDA device 130.

Wireless data retrieval apparatus 120 represents a simply and inexpensive alternative for transferring correspondence information between different PDA devices 110 and 130. To perform this relatively limited data transfer function, wireless data retrieval apparatus 120 primarily contains components for transferring correspondence information between PDA devices. As such, wireless data retrieval apparatus 120 does not provide other capabilities of PDA devices, e.g., games, electronic mail (e-mail)services, address books and word processing applications.

Figure 2:
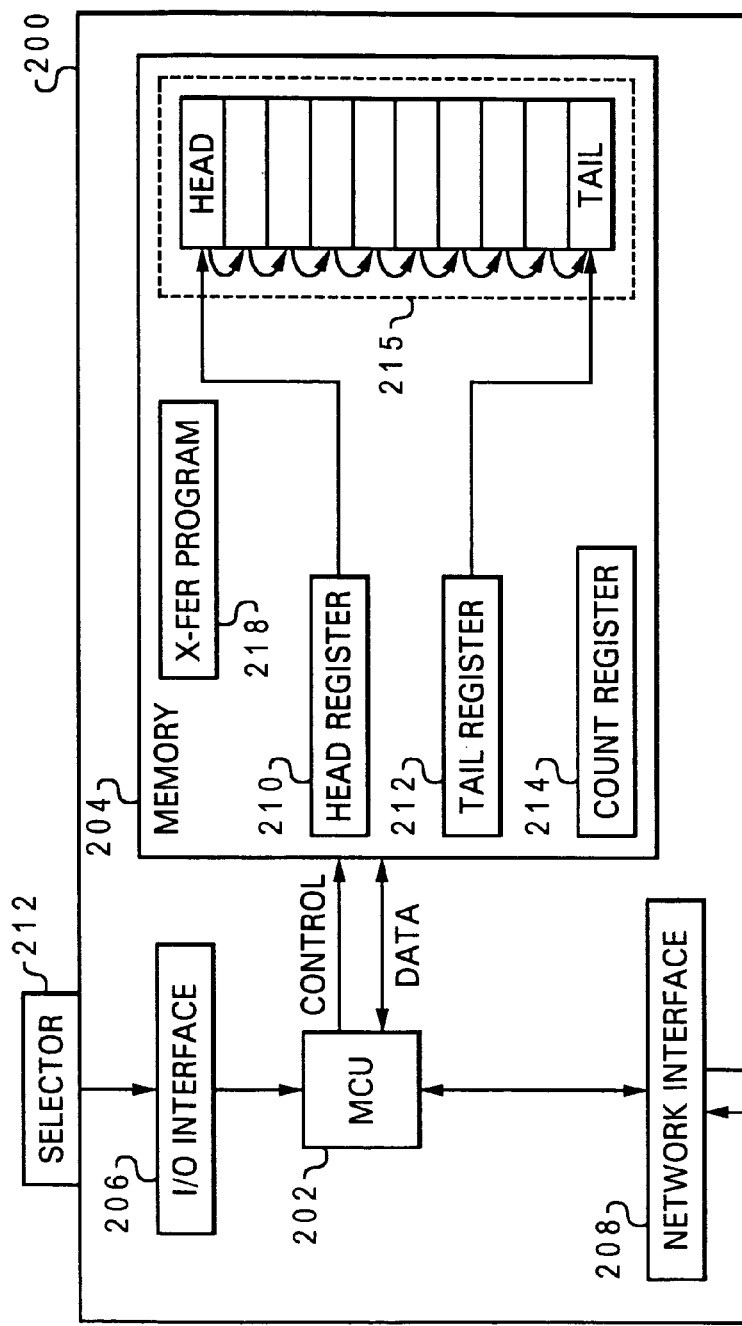
FIG. 2 depicts a wireless data retrieval apparatus in accordance with one embodiment of the present invention.

With reference to FIG. 2, there is depicted a wireless data retrieval apparatus 200 in accordance with one embodiment of the present invention. Specifically, wireless data retrieval apparatus 200 includes a memory device 204, a memory control unit (MCU) 202, a network interface 208, an input/output (I/O) interface 206. Although not explicitly illustrated in FIG. 2, a power supply such as a battery is required to provide electrical power to the active components within data retrieval apparatus 200.

Memory device 204 contains the necessary data and programming structures required for the operation of data retrieval apparatus 200. Illustratively, memory device 204 includes a wireless data transfer program 218 and a linked list 215. Wireless data transfer program 218 is specifically configured for implementing the wireless data reception and transmission to and from data retrieval apparatus 200 in accordance with the principles set forth herein. Linked list 215 contains records (data objects) corresponding to various correspondence information such as business card information and appointment information.

I/O interface 206 comprises a controller that couples a selector 212 to MCU 202. A user initially activates selector 212 to select a type of PDA device, as defined by its operating system, for receiving correspondence information from transmitting PDA device 110. Additionally, selector 212 may be utilized to initiate the receipt of correspondence information into data retrieval apparatus 200, to retrieve correspondence information from memory 204, or to transmit correspondence information to receiving PDA device 130. Examples of selector 212 include a push button, a switch, and the like.

In one embodiment, network interface 208 comprises an infared port that couples MCU 202 to transmitting PDA device 110 and receiving PDA device 130. The infared port is utilized to synchronize data retrieval apparatus 200 to the operating system of the transmitting PDA device 110 or the receiving PDA device 130. For example, synchronization between data retrieval apparatus 200 and transmitting PDA device 110 occurs after the user activates selector 212 and data retrieval apparatus 200 is placed within a relatively short, threshold distance from transmitting PDA device 110. Once data retrieval apparatus 200 is synchronized with the operating system of transmitting PDA device 110, correspondence information is transferred from transmitting PDA device 110 into data retrieval apparatus. Similarly, data retrieval apparatus 200 must synchronize with the operating system of receiving PDA device 130 prior to sending correspondence information thereto.

Memory device 204 comprises digital data storage media suitable for retrieving correspondence information from and writing correspondence information to. As such, memory device 204 may comprise non-volatile memory elements such as a magnetic storage device, an optical disk, etc., or volatile memory elements such as static random access memory (SRAM) or dynamic random access memory (DRAM). To minimize overall device complexity, memory device 204 may comprises one or more registers configured to physically receive and dispense data in serial First-In-First-Out (FIFO) manner.

Linked list 215 comprises multiple serially linked storage blocks including a Head block and a Tail block wherein the Head block is the first storage block and the Tail block is the last block within linked list 215. In accordance with the depicted embodiment, linked list 215 is managed as a FIFO queue utilizing a head register 210, a tail register 212, and a count register 214, which function as boundary and parametric guides for linked list 215. Head register 210 tracks the Head block from which data objects within linked list 215 are dequeued. Count register 214 maintains a count of the number of storage blocks that are incorporated within linked list 215 at any given time. The count within count register 214 is updated for each enqueueing or dequeueing operation to or from linked list 215. Tail register 104 tracks the Tail block prior to each data enqueue operation.

A typical enqueuing process for retrieving and storing data from transmitting PDA device 110 into linked list 215 proceeds as follows. A user wishing to retrieve correspondence information from transmitting PDA device 110 activates selector 212 while placing data retrieval apparatus 200 within a threshold distance of PDA device 110. After synchronizing network interface 208 with transmitting PDA device 110, MCU 202 delivers a control request to memory device 204 to add a data object to linked list 215. In response to the data enqueue request from MCU 202, the address of the current Tail block is read from tail register 212. An address register (not depicted) from the pool of free registers within memory device 204 is then accessed to obtain the address of an available storage block within the free pool. The address of the accessed free pool register becomes the new tail pointer which is written into the pointer field (not depicted) of the old Tail block. A second write operation is then performed to write the requested correspondence data object into the data field (not depicted) of the new Tail block.

A typical process for delivering correspondence information from linked list 215 into receiving PDA device 130 proceeds as follows. A user wishing to send the correspondence information activates selector 212 while placing data retrieval apparatus 200 within a threshold distance of PDA device 110. After synchronizing network interface 208 with transmitting PDA device 110, MCU 202 delivers a control request to memory device 204 to read a data object from linked list 215. In response to the read request from MCU 202, the address of the current Head block is read from head register 210. Data is then read from linked list 215 in a FIFO manner, since data within the Head block was the first data input within linked list 215.

Figure 3:
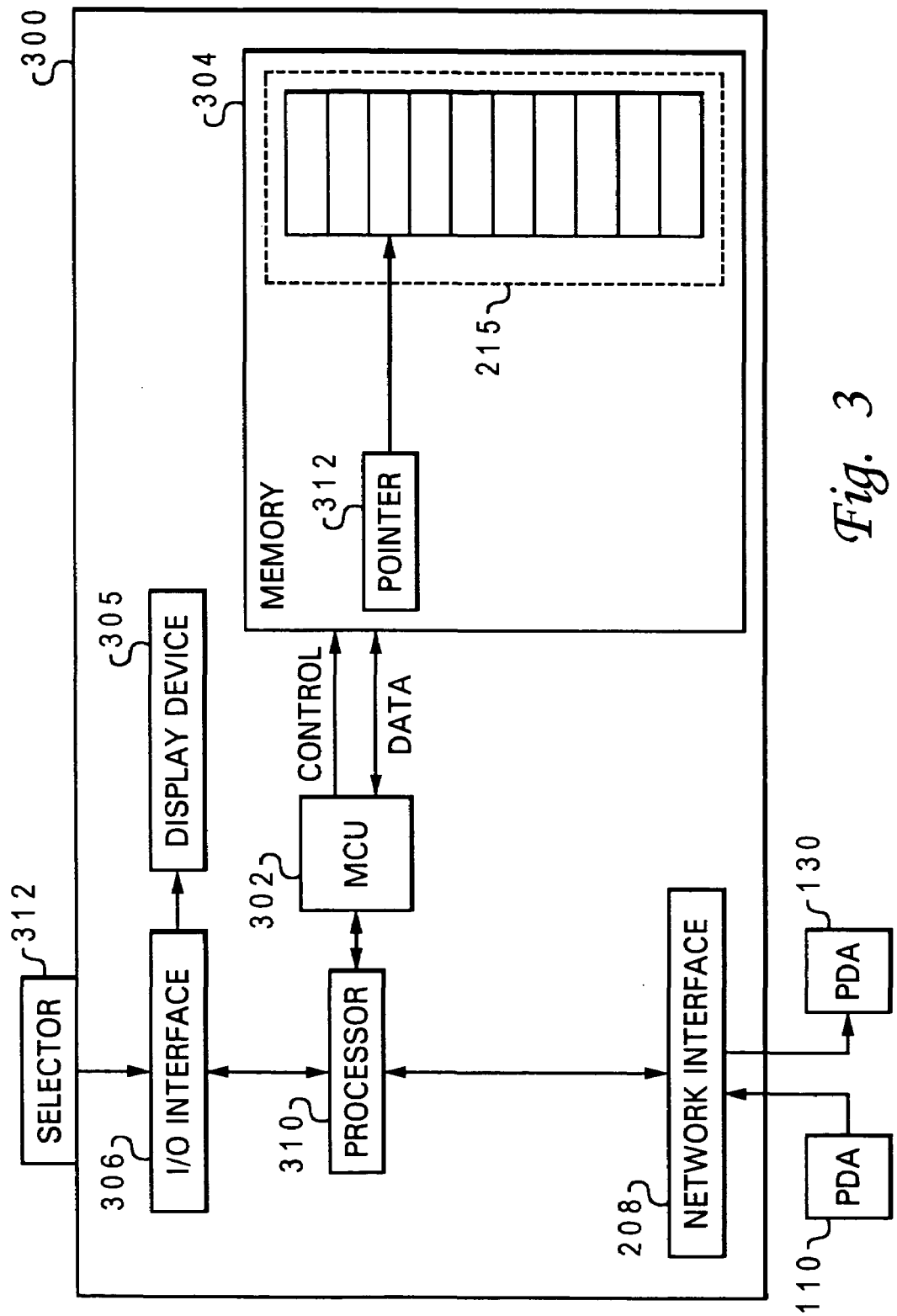
FIG. 3 illustrates the wireless data retrieval apparatus depicted in FIG. 2 with the addition of a display and movable display pointer in accordance with an alternate embodiment of the present invention.

Referring to FIG. 3, there is illustrated a wireless data retrieval apparatus 300 in accordance with an alternate embodiment of the present invention. Similar to data retrieval apparatus 200, data retrieval apparatus 300 includes a selector 312, an I/O interface 306, a MCU 302, network interface 208, and a memory device 304. However, in accordance with the depicted embodiment data retrieval apparatus 300 further comprises a display device 305 and a movable data pointer 312. A more versatile processor 310 is included for supporting data manipulation within memory device 304 as explained herein.

Processor 310 receives instructions from memory device 304 via MCU 302 and performs operations based upon the requirements of an operating system in conjunction with a wireless data transfer program (not depicted). To implement data retrieval and transmission to and from transmitting PDA device 110 and receiving PDA device 130, respectively, processor 310 executes the wireless data transfer program.

A movable pointer 312 is included within memory 204 to facilitate user selectability of correspondence data within linked list 215. In response to user input via selector 312, or alternate suitable input means, processor 310 moves pointer 312 sequentially through records within linked list 215. Thus any retrieved or stored correspondence information within data retrieval apparatus 300 may be viewed by a user via display device 305.

Figure 4:
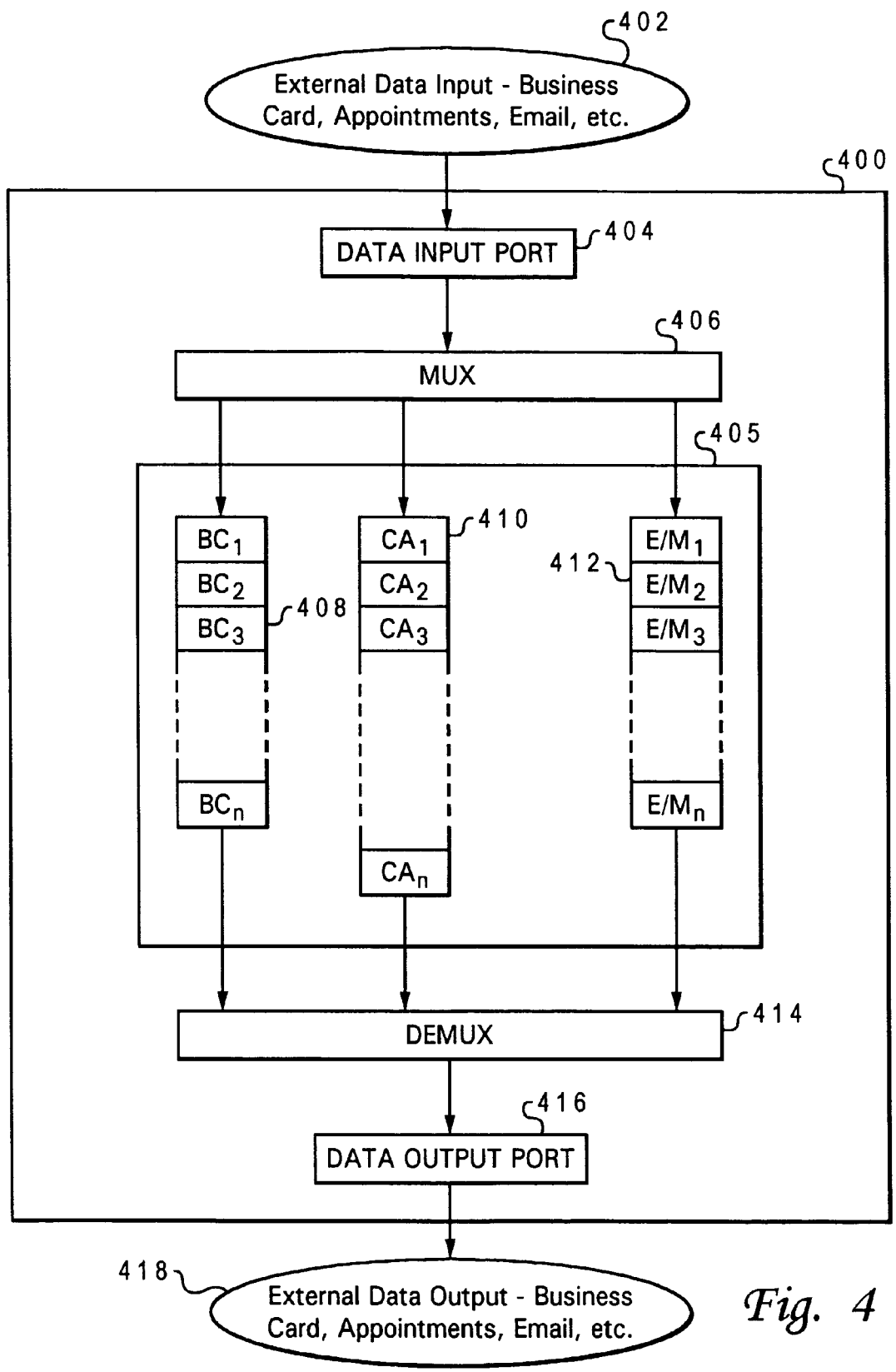
FIG. 4 depicts an alternate embodiment of a wireless retrieval apparatus wherein multiple types of correspondence data are categorized and assembled utilizing designated queues.

With reference to FIG. 4, there is depicted an alternate embodiment of a wireless retrieval apparatus wherein multiple types of correspondence data are categorized and assembled utilizing designated queues. Specifically, a data retrieval apparatus 400 is illustrated wherein three linked lists 408, 410, and 412 are incorporated within a FIFO queue 405 that stores business card, calender appointment, and email/message records, respectively. A need for such record type categorization and separation into separate sub-queues may arise, for example, when different record types require differing amounts of memory.

As depicted in FIG. 4, external data 402 delivered from a transmitting PDA device is received by data retrieval apparatus 400 at a data input port 404. A multiplexor 404 receives input data object from data input port 404 selects a destination from among the available linked lists 408, 410, and 412. A complementary demultiplexor 414 performs the inverse function of retrieving data objects from among linked lists 408, 410, and 412 that correspond to a given data retrieval request and delivering such demultiplexed data as output correspondence data 418 through data output port 416.

While the invention has been particularly shown and described with reference to a preferred embodiment, it will be understood by those skilled in the art that various changes in form and detail may be made therein without departing from the spirit and scope of the invention.

What is claimed is:

1. An apparatus for facilitating the synchronization of data between a first personal digital assistant (PDA) device and a second PDA device, said apparatus comprising:
    a selector;
    a memory having a data transfer program for translating information from a format usable by an operating system of said first PDA to a format usable by an operating system of said second PDA and vice versa, wherein said memory further includes a FIFO memory queue in a linked list configuration, wherein said FIFO memory queue includes a plurality of linked lists, wherein each of said plurality of linked lists stores a designated catergory of information
    a multiplexor for delivering incoming information into a specified one of said plurality of linked lists;
    means for wirelessly receiving data from said first PDA to said memory in response to said selector being switched to a first position, wherein said first PDA is placed in close proximity to said apparatus; and
    means for wirelessly transmitting data from said memory to second PDA in response to said selector being switched a second position, wherein said second PDA is placed in close proximity to said apparatus.

2. The apparatus of claim 1, wherein said apparatus further includes a processor configured to access information contained in said memory.

3. The apparatus of claim 2, wherein said apparatus further includes a user-operated input interface for delivering commands to said processor.

4. The apparatus of claim 3, wherein said user-operated input interface includes a mouse, a stylus, a rollerball, or a button.

5. The apparatus of claim 2, wherein said memory stores a plurality of operating systems usable by said processor.

6. The apparatus of claim 1, wherein said apparatus further includes a display for displaying contents of said FIFO memory queue.

7. The apparatus of claim 6, wherein said apparatus further includes a data pointer for providing said contents of said FIFO memory queue to said display.

8. The apparatus of claim 1, wherein said apparatus further includes a demultiplexor for retrieving data objects from among said plurality of linked list according to a specific data retrieval request.

* * * * *